US008628711B2

(12) United States Patent  
Lin et al.

(10) Patent No.: US 8,628,711 B2  
(45) Date of Patent: Jan. 14, 2014

(54) IN-MOLD LABEL AND METHOD FOR PRODUCING THE SAME

(75) Inventors: Allen F.C. Lin, Taipei (TW); Hong Kuo Cheng, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 437 days.

(21) Appl. No.: 12/903,410

(22) Filed: Oct. 13, 2010

(65) Prior Publication Data

US 2012/0094069 A1 Apr. 19, 2012

(51) Int. Cl.
*B32B 1/08* (2006.01)

(52) U.S. Cl.
USPC .......................................... 264/284; 264/280

(58) Field of Classification Search
USPC ................................................. 264/280, 284
See application file for complete search history.

(56) References Cited

U.S. PATENT DOCUMENTS

| 4,986,866 | A | * | 1/1991 | Ohba et al. ..................... 156/220 |
| 5,254,302 | A | | 10/1993 | Yamanaka |
| 6,551,671 | B1 | | 4/2003 | Nishizawa et al. |
| 6,576,325 | B1 | * | 6/2003 | Yamanaka et al. .......... 428/195.1 |
| 6,858,283 | B2 | * | 2/2005 | Nishizawa et al. ............ 428/137 |

* cited by examiner

*Primary Examiner* — Galen Hauth  
(74) *Attorney, Agent, or Firm* — Rosenberg, Klein & Lee

(57) ABSTRACT

Provided is an in-mold label and a method for producing the in-mold label which has a heat-sealable resin layer with a plurality of interlaced and continuous-arranged micro-protrusions. While the in-mold label is combined on a surface of a specific article, the micro-protrusions may provide multiple blister-exhausting paths. As a result, it is effective to drive out the blisters as combining the label and the article. The in-mold label particularly includes a substrate made of a thermoplastic resin material, a printed layer on the substrate's one surface, and the other surface made of heat-sealable resin. With an embossing process, the heat-sealable resin layer having the interlaced and continuous-arranged micro-protrusions is formed. The in-mold label can be sealed to the article surface excellently since the micro-protrusions form the multiple paths for exhausting the blisters effectively.

2 Claims, 5 Drawing Sheets

IN-MOLD LABEL AND METHOD FOR PRODUCING THE SAME

BACKGROUND OF THE INVENTION

1. Field of the Invention

The instant disclosure relates to an in-mold label and its producing method, more particularly to the in-mold label with a heat-sealable resin layer of a plurality of interlaced and continuous-arranged micro-protrusions.

2. Description of Related Art

Generally, if a picture or text needs to be printed on a bottle or surface of any article, a label with sticker is usually adapted to sticking the label with the article. In the process of sticking, some annoying blisters may stay inside the label if the blisters are not effectively driven out. Also, those inside blisters may cause the label easily to fall off.

Nevertheless, a kind of in-mold label has been developed in the conventional technology. In the process of producing a container or any product, one process selected from an injection molding, a blow molding, a differential pressure molding, and a foam molding is introduced therefor. In the process, a dry-type hot-melt adhesive is processed on the back side in advance. After a printing process, the glued label is fed and adhered to a specified position in a mold. The adhered label is with the forming plastics and formed in one piece in the mold. Further, the prepared dry-type hot-melt adhesive is adhered to the article or container. These described steps allow the thermoplastic label material with the printed picture or/and text to be embossed on the surface of any product. So that, the label is united with the product. For example, the kind of in-mold label is applicable to any surface of bottle for illustrating the product. Example of the in-mold label may not have problem of adhering the traditional label onto the product's surface since the label conventionally uses paper or the like materials.

Some conventional technologies are known to develop the methods to produce the in-mold label. The label may be usually made of paper or other like materials such as polypropylene or polystyrene. FIG. 1 shows a lateral view of an in-mold label disclosed in the specification of U.S. Pat. No. 6,551,671.

Example of the multi-layer structure of the in-mold label 10 is schematically shown in the figure. A substrate is a base layer 12 which is made of thermoplastic resin material. The upper surface of the structure is printed matter 13, which is the surface where the picture or text is printed thereon. The lower surface of base layer 12 is a heat-sealable resin layer 14. In one case, the surface 15 of the heat-sealable resin layer 14 has holes which are used for create the protrusions. Therefore, the blisters may be exhausted as fabricating the label and surface of product.

The mentioned heat-sealable resin layer 14 is formed as the heat-sealed layer on the product's surface, and the protrusions including top parts and bottom parts are useful to exhaust the blisters as fabrication. The related conventional technology can be referred to U.S. Pat. No. 5,254,302 which disclosed the surface structure of in-mold label as shown in FIG. 2.

The shown adhesive layer 20 is formed as a lattice pattern on the surface of a heat-sealable resin layer. The layer 20 includes the top part 22 and valley part 24. The top part 22 and the valley part 24 form the paths to exhaust the blisters when the layer is sealed on a surface. After that, the adhesive layer 20 may be completely sealed on the surface while the top part 22 and the valley part 24 disappear.

SUMMARY OF THE INVENTION

An in-mold label with heat-sealable resin layer having interlaced and continuous-arranged micro-protrusions is disclosed. In an example, the plural interlaced and continuous-arranged micro-protrusions provide multiple directional paths to exclude the air while the in-mold label is fabricated with an article. It featured that the described micro-protrusions effectively prevent the unnecessary blisters, and the in-mold label can be well sealed onto the article's surface.

Example of the in-mold label particularly includes a substrate made of thermoplastic resin material. Picture or text is preferably printed on one surface of a printed layer for presenting the printed content on the article. A heat-sealable resin material is then applied onto the other surface of substrate. In particular, the interlaced and continuous-arranged micro-protrusions are formed on the surface of heat-sealable layer by an embossing process. Therefore, a plurality of exhausting paths are formed. The micro-protrusions effectively exclude the blisters as fabricating the in-mold label onto a surface. The label can be well sealed on the surface of an article.

The method for producing the in-mold label has a first step of preparing a substrate with thermoplastic resin material, and an embossing apparatus having surface structure. The substrate is then conducted with an embossing process using the embossing apparatus. For example, a roller having surface structure is used to conduct the embossing process. The heat-sealable resin material is used to form the interlaced and continuous-arranged micro-protrusions. The printed layer, the thermoplastic resin substrate, and the heat-sealable resin layer are fabricated as the in-mold label.

According to one of the embodiments, the thickness of the in-mold label is about 60 micrometer to 120 micrometer. The density range of the apparatus is from 0.50 to 1.05 g/cm$^3$. The interlaced and continuous-arranged micro-protrusions form the multiple types of interlaced and continuous-arranged holes, which are with depths from 8 micrometer to 14 micrometer, spacings there-among are from 10 micrometer to 1000 micrometer, and diameters are from 1000 micrometer to 1600 micrometer.

Table 1, according to an experiment, demonstrates the claimed in-mold label having interlaced and continuous-arranged micro-protrusions provides more efficient exhausting performance than the conventional technologies.

| prior arts items | R.O.C. (TW) 290674 (January 1996) | U.S./EP PCTJP0105105 (June 2001) | U.S. Pat. No. 6,551,685 (June 2001) | present invention |
| --- | --- | --- | --- | --- |
| depth (μm) | 1~8 | 0.5~5 | 5~10 (dotted) | 8~14 |
| spacing (μm) | 1016~5080 | N/A | 4000 | 10~1000 |
| Hole diameter (μm) | N/A | 50~1000 | 60~100 | 1000~1600 |

These and other various advantages and features of the instant disclosure will become apparent from the following description and claims, in conjunction with the appended drawings.

DETAILED DESCRIPTION OF THE PREFERRED EMBODIMENTS

In view of the problem resulting in the poor adhesion while the blisters are produced as the conventional in-mold label is adhered with an article. In the present invention, provided is an in-mold label with a heat-sealable resin layer having interlaced and continuous-arranged micro-protrusions. The interlaced and continuous-arranged micro-protrusions allows the in-mold label is well adhered onto an article. Furthermore, according to the experiments, the micro-protrusions provide more efficient effect of blister-exhausting than the conventional technologies.

Figure 1:
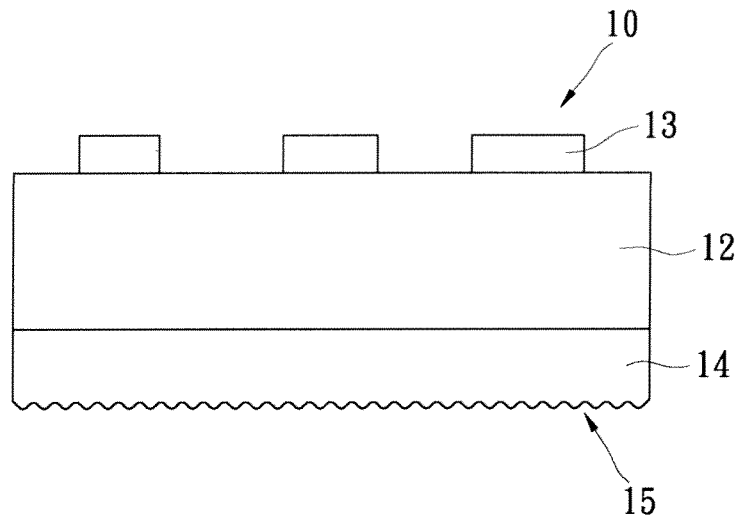
FIG. 1 schematically shows a diagram of lateral side of conventional in-mold label.
Figure 2:
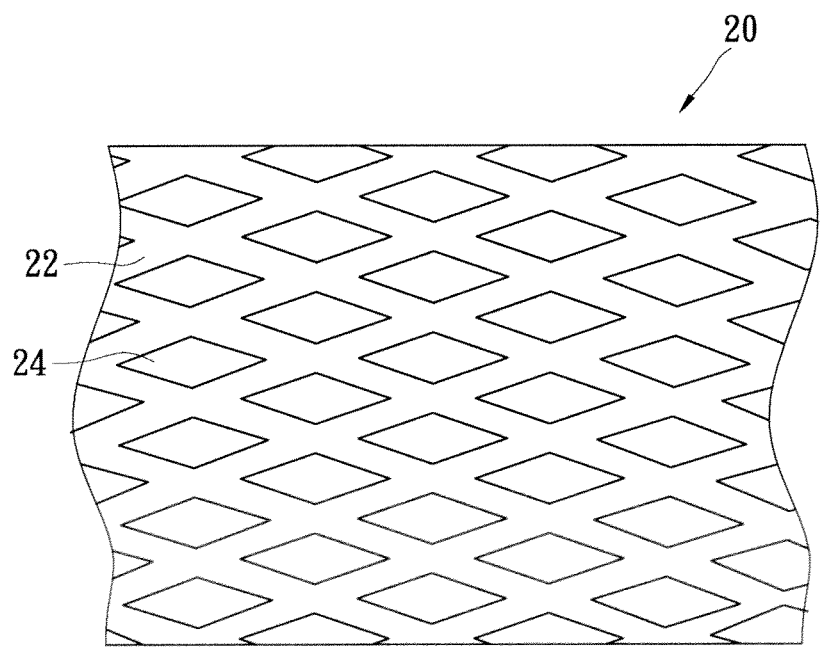
FIG. 2 shows a schematic diagram describing the surface of the conventional in-mold label.

Reference is made to FIG. 1 describing the main structure of an in-mold label. Example of the in-mold label includes a substrate which is preferably a base layer made of thermoplastic resin material. A first surface and a second surface are respectively represent the top surface and the bottom surface of the substrate. The substrate is properly a thermoplastic resin film substrate, which has plastic property after a heating process, for conveniently combining with an article.

Further, a printed layer is formed on the first layer. The printed layer is used for showing a printed content. Any printed material is used to print content on the printed layer, including the picture or text. The second surface of substrate has a heat-sealable resin layer. Through an embossing process, interlaced and continuous-arranged micro-protrusions are formed on the layer. One of the objectives is to form multiple paths in order to effectively exhausting the blisters.

According to one of the embodiments, in the process of producing the in-mold label, the embossing materials, such as thermoplastic resin, are prepared by a heating process. Next, a roller imprinting or a plate pressing is used to perform the embossing to form holes on the surface. After a proper cooling procedure, the holes are patterned to form the in-mold label. Other surface, rather than the above described holed surface, of the in-mold label is provided for printing picture or text.

The holed surface is used to combine with the surface of article. In particular, the holes drive the blisters out by means of vacuuming or embossing method. As a result, the in-mold label can be well sealed with the surface of article without uneven adhesion and blistering.

Figure 3A:
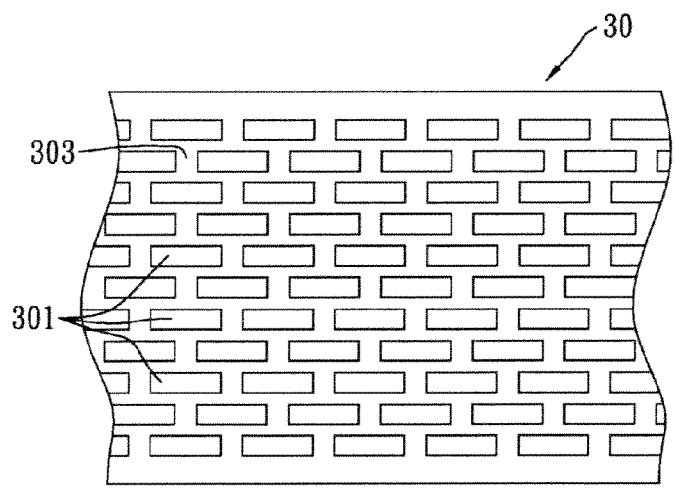
FIG. 3A shows a schematic diagram of the surface of in-mold label of one embodiment in accordance with the present invention.

FIG. 3A shows one of schematic diagrams of surface structure of the in-mold label in accordance with the present invention. A surface 30 of the in-mold label is shown. In this schematic diagram, the top part 301 is presented as nearly rectangular form. The rest part is plane 303. Those top parts 301 are interlaced and continuous-arranged micro-protrusions.

Figure 3B:
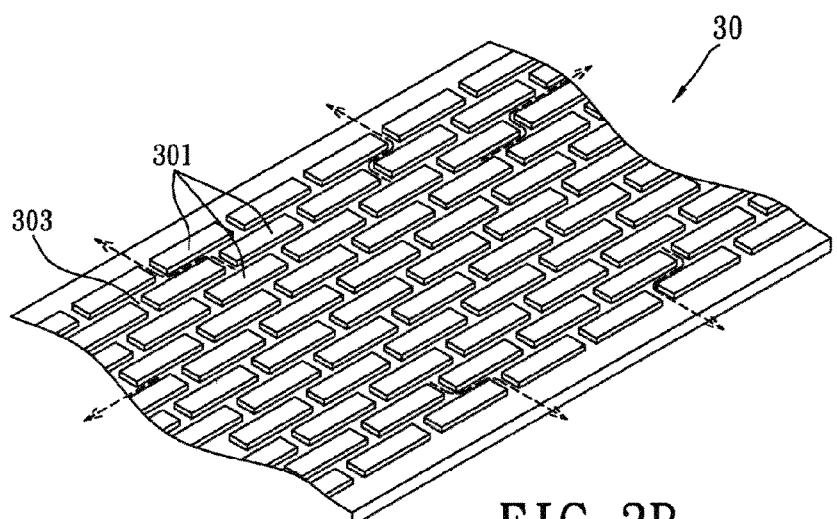
FIG. 3B shows the surface of in-mold label in second embodiment of the present invention.

FIG. 3B perspectively shows the surface structure in another schematic diagram. The top parts present the protrusions 301 on the surface 30 of in-mold label. The protrusions 301 are interlaced and continuous-arranged.

Figure 3C:
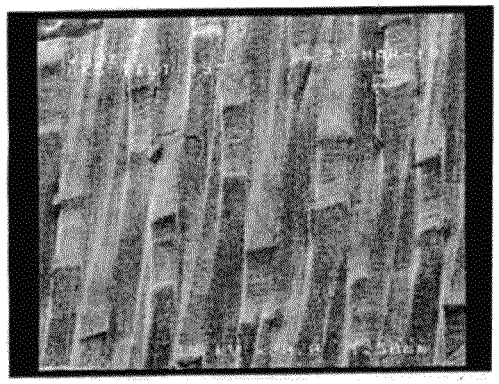
FIG. 3C schematically shows the micro-protrusion of the surface of in-mold label in accordance with the present invention.

Further reference is made to FIG. 3C, which is taken from an actual image using microscope, showing the exhausting holes of surface structure of an in-mold label in accordance with the present invention. It appears the plurality of interlaced and continuous-arranged micro-protrusions. The top parts form the blister-exhausting paths shown as the dotted lines in FIG. 3B. While the in-mold label is combined with the surface of article, the exhausting paths provided by the interlaced and continuous-arranged micro-protrusions may effectively exclude the blisters. So that the in-mold label may be sealed with the surface well.

Figure 4:
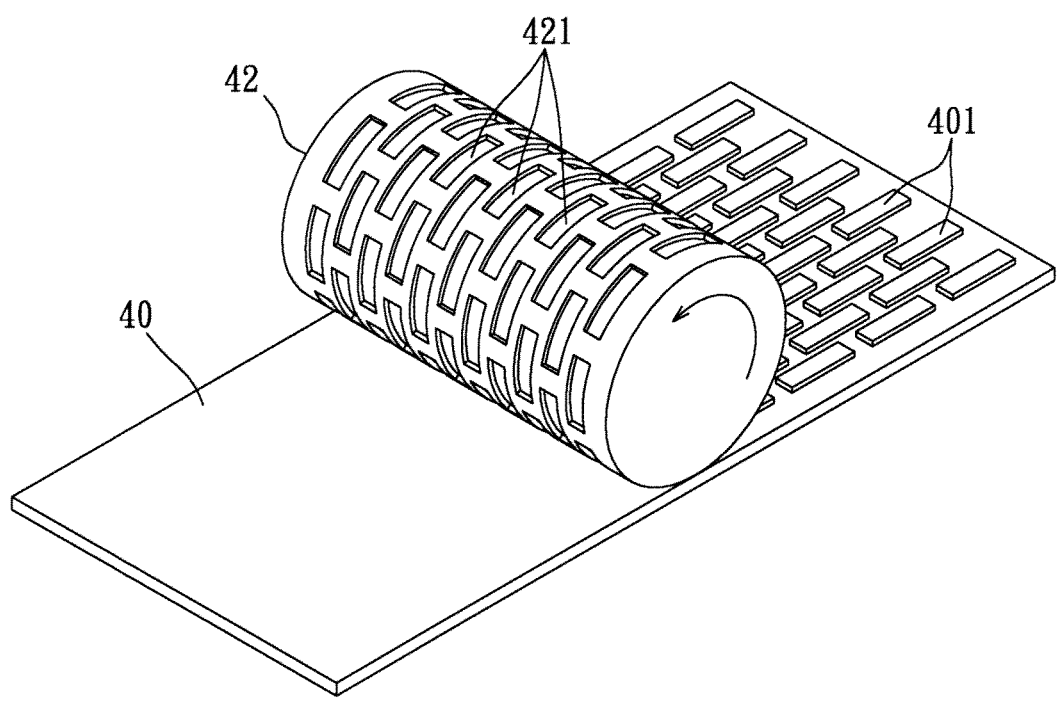
FIG. 4 schematically shows the in-mold label produced by a roller imprint process in accordance with the present invention.
Figure 5:
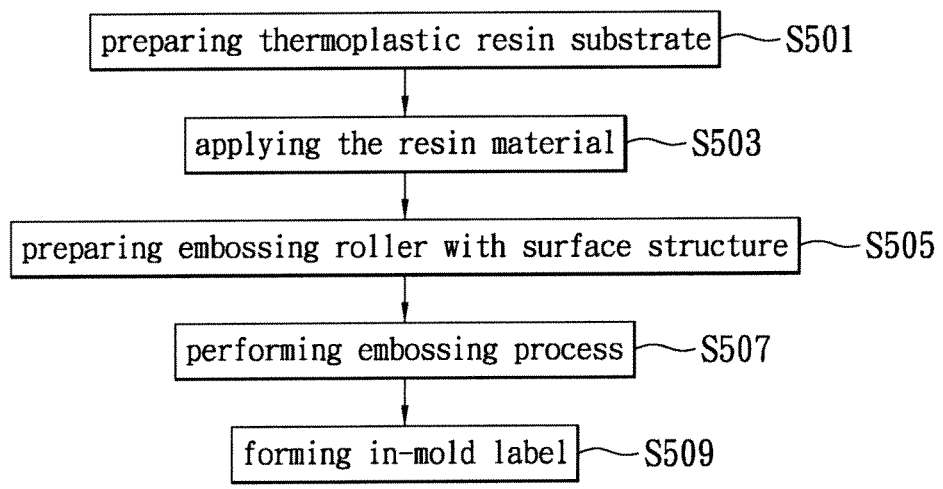
FIG. 5 is a flow chart illustrating the method for producing the in-mold label in accordance with the present invention.

FIG. 4 shows a diagram using a roller embossing process to produce the in-mold label with the interlaced and continuous-arranged micro-protrusions. The surface of the shown embossing roller 42 includes surface structure 421, thereby the heat-sealable resin material 40 is embossed to produce the interlaced and continuous-arranged micro-protrusions, such as the surface texture 401 shown in the figure. The relevant procedure can be referred to producing steps described in FIG. 5. The producing process in one embodiment may refer to R.O.C. Patent No. TW526136 (App. No. 088113590, Applicant: Nan-Ya Plastics Corporation). TW526136 describes a method for producing a polypropylene pearl synthetic paper or transparent film with three-layer co-extrusion biaxial-stretching for the in-mold label.

In step S501, a substrate material, for example the thermoplastic resin material, is prepared firstly.

In step S503, the thermoplastics resin material is applied onto the substrate for forming a heat-sealable resin layer, which is preferably the heat-sealable layer for in-mold label. The next step S505 in the method is to prepare the embossing roller with surface structure.

The step S507 in the method is to perform a heating process, embossing and cooling process. The plural interlaced and continuous-arranged micro-protrusions are then formed on the heat-sealable resin layer. At last step S509 in the method, the printed layer, and the thermoplastic resin substrate are combined with the heat-sealable resin layer, and to form the in-mold label.

In an example, the mentioned thermoplastic resin substrate is prepared by performing an extrusion process using an extrusion machine. The thermoplastic resin material is combined with the heat-sealable resin layer at the same time, or alternatively the heat-sealable resin layer is combined afterward. The combination process allows the material to be a useful type by extrusion. After the extrusion process, the substrate is under a cooling process through a cooling-molding wheel apparatus. In particular, the surface structure of substrate may be changed by heating and stretching its material.

For example, a longitudinal stretching process and a transverse stretching process are configured to produce the surface structure of the heat-sealable layer. A corona-treatment apparatus is then used to perform a corona-treatment process in order to change its physics property under a surface treatment. In practice, the in-mold label is applicable to printing, coating, gluing, laminating, or other process.

In the preferred embodiment, the total thickness of the in-mold label is from 60 micrometer to 120 micrometer. The density of the whole label is from 0.50 to 1.05 $g/cm^3$. The interlaced and continuous-arranged micro-protrusions form the various types of interlaced and continuous-arranged holes. Preferably, the depth range of hole is from 8 micrometer to 14 micrometer. The spacing among holes is around 10 micrometer or 1000 micrometer. Further, diameter for each micro-production is from 1000 micrometer to 1600 micrometer.

Figure 6:
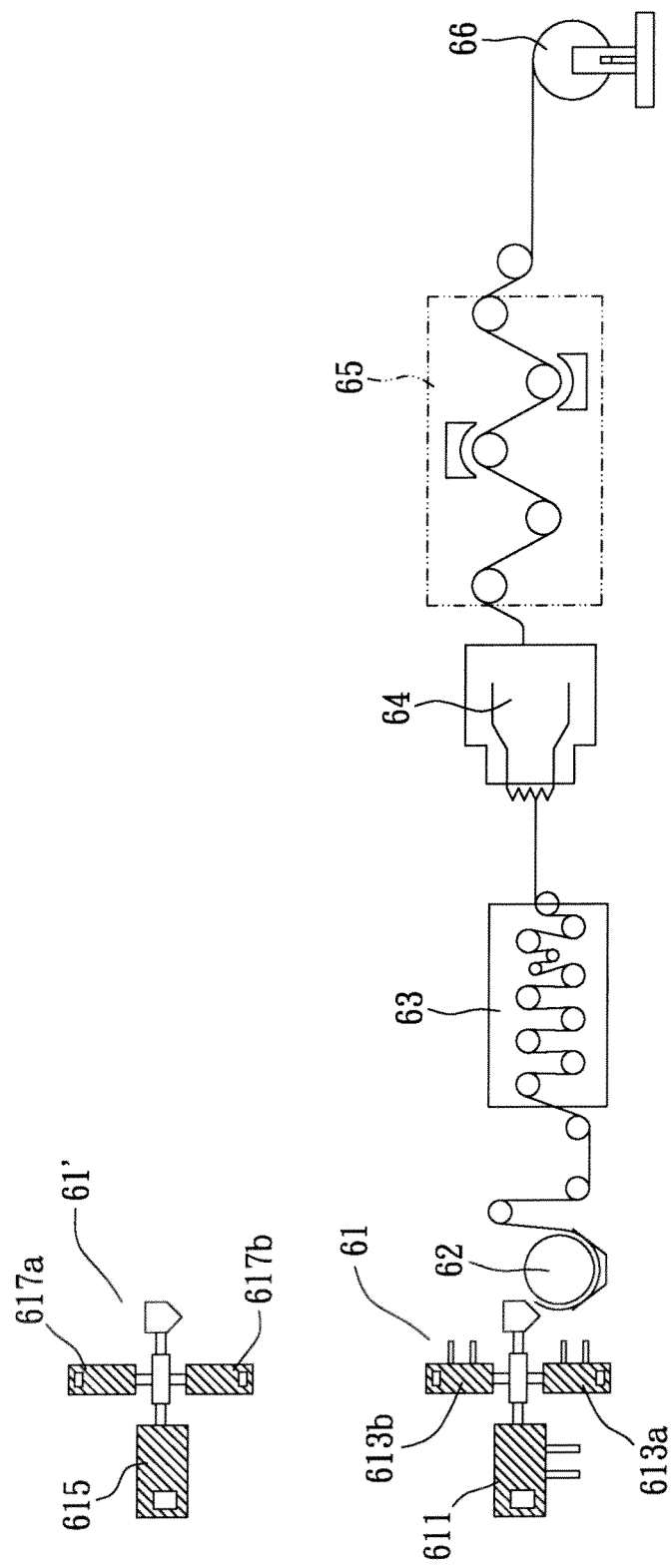
FIG. 6 is a schematic diagram of a system for producing Biaxial-Oriented Polypropylene pearl synthetic paper and transparent film in accordance with the present invention.

FIG. 6 shows a flow chart illustrating the method for producing the substrate of claimed in-mold label. In particular, the method adopts a production system of biaxial-oriented polypropylene pearl synthetic paper and a transparent film. In this case, the in-mold label includes three layers, which are produced by a three-layer co-extrusion process. The main component of material therefor is polypropylene. However, the following, but not limited to, discloses one of the embodiments in accordance with the present invention.

In the process of producing the claimed in-mold label, a co-extrusion process is particularly used to produce a thermoplastic resin substrate. Reference is made to the following embodiment and in view of the production system in FIG. 6.

A producing method for the biaxial-oriented polypropylene pearl synthetic paper and transparent film is introduced into the production of the in-mold label. The preferred embodiment of the in-mold label adopts three-layer structure. In one of the embodiments, the three-layer structure can be implemented as mist-surface layer/foaming-middle layer/adhesive layer, smooth-surface layer/foaming-middle layer/adhesive layer, or resin layer/resin layer/adhesive layer. In which, the adhesive layer may adopt the material such as PP, LPPE, or HDPE, which is applicable to the specific material of bottle such as PP, LPPE, or HDPE. As a result, the in-mold label can be combined with the bottle in a mold with bottle blow or injection forming process in one piece, especially by a chemical bonding.

The front-end of the system shown in the diagram includes the extrusion machines 61, 61'. The numeral 61 denotes an exhaustion-type twin-screw extrusion machine with a side-feeding device which is used to produce the pearl synthetic paper. This extrusion machine 61 preferably includes an exhaustion-type twin-screw primary extruder 611 and two exhaustion-type twin-screw secondary extruders 613a, 613b with a side-feeding device. The temperature condition is configured by referring to the combination of resin materials, MFI (melt flow index), degree of crystallization, speed of production line, and product thickness. More particularly, after the extrusion and stretching process, an embossing apparatus, such as embossing roller, with specific surface structure performs an embossing process. The interlaced and continuous-arranged hole structure is formed on the heat-sealable resin layer of in-mold label. The relevant embodiments can be referred to FIGS. 3A to 3C.

According to another embodiment, a single-screw extrusion machine 61' for producing the transparent film is also used. This extrusion machine 61' includes a single-screw primary extruder 615 and two single-screw secondary extruders 617a, 617b. The temperature configuration is based on the various material types, MFI, degree of crystallization, speed of production line, and product thickness.

When the material undergoes the extrusion forming by the extrusion machine 61, 61' and heating process, a cooling process is then performed through a cooling-molding wheel apparatus 62. This cooling process may also be performed by a water-cooled or air-cooled machine, which is used to cool down the materials under the heating and co-extrusion processes. More particularly, the temperature under the cooling process should be well controlled, and pertinent to the further procedures. In practice, the temperature is adjustable and configured to comply with the thickness of the label's material, such as the thermoplastic resin, and the speed of production line.

After the cooling process, the label is initially formed. After that, the substrate is fed to a longitudinal stretching apparatus 63 for performing the longitudinal stretching process. Similarly, the related temperature related to the thickness of the substrate and the speed of production line is configured to preheat the substrate. The material of substrate is then softened. Next, the substrate is proceeding as two stages of stretching processes including a low speed stretching and a high speed stretching. As a result, the in-mold label is endowed with longitudinal strength, and then annealed and shaped.

The material undergoing the longitudinal stretching is further fed to a transverse stretching apparatus 64 for performing the transverse stretching process. The method is to preheat and soften the thinner material as undergoing the previous longitudinal stretching process. The temperature is reasonably configured as referring to the thickness of material and the speed of production line. After this transverse stretching process, the label is again annealed and shaped. Preferred to the example of the label, such as the pearl synthetic paper, the label partially shrinks in order to strengthen the structure for complying with specified requirements.

After the label is formed, a corona-treatment apparatus 65 may be incorporated to perform a corona-treatment process. This process can improve the physical properties of the surface of pearl synthetic paper and the transparent film in order to be applicable to further printing, coating, gluing, and adhering processes. The surface may reach a required wetting tension by specifying a processing power performed by a high-frequency discharging apparatus. This discharging apparatus is conducted to process single or double treatment thereon according to the speed of production line.

At last, the in-mold label is formed through a roll-up apparatus 66 after the mentioned corona-treatment process. One of the embodiments in accordance with the present invention is to roll up the pearl synthetic paper with a specific width using a metal tube. The product may be slit, cut, rolled up, or sliced as required.

To sum up, provided is the in-mold label and its producing method. The method is particularly to emboss the heat-sealable layer of the label to form the interlaced and continuous-arranged micro-protrusions. This heat-sealable resin layer is contributive to exhaust the blisters as combining the in-mold label with a specific article.

While the above description constitutes the preferred embodiment of the instant disclosure, it should be appreciated that the invention may be modified without departing from the proper scope or fair meaning of the accompanying claims. Various other advantages of the instant disclosure will become apparent to those skilled in the art after having the benefit of studying the foregoing text and drawings taken in conjunction with the following claims.

What is claimed is:

1. A method for producing an in-mold label, the method comprising:
   providing a thermoplastic resin substrate;
   applying a heat-sealable resin material on surface of the thermoplastic resin substrate;
   providing an embossing apparatus with surface structure;
   driving the embossing apparatus to perform a heating-embossing-cooling process to form a heat-sealable resin layer with interlaced and continuous-arranged nearly-rectangular micro-protrusions upon the surface of the thermoplastic resin substrate using the embossing apparatus to create such surface structure; wherein the protrusion has a depth of from 8 micrometer to 14 micrometer, spacing among the protrusions is from 10 micrometer to 1000 micrometer, and one side of the nearly-rectangular formed micro-protrusion is around from 1000 micrometer to 1600 micrometer; and forming a printed layer, the thermoplastic resin substrate, and the heat-sealable resin layer, which are combined to form the in-mold label;

wherein, while the in-mold label is combined on a surface of an article, the micro-protrusions render multiple blister-exhausting paths.

2. The producing method of claim 1, wherein the process of providing the thermoplastic resin substrate further comprises:

driving an extrusion machine to perform an extrusion process, including a heating process;

driving a cooling-molding wheel apparatus to perform a cooling process;

driving a longitudinal stretching apparatus to perform a longitudinal stretching process;

driving a transverse stretching apparatus to perform a transverse stretching process; and driving a corona-treatment apparatus to perform a corona-treatment process.

\* \* \* \* \*